Figure 1:
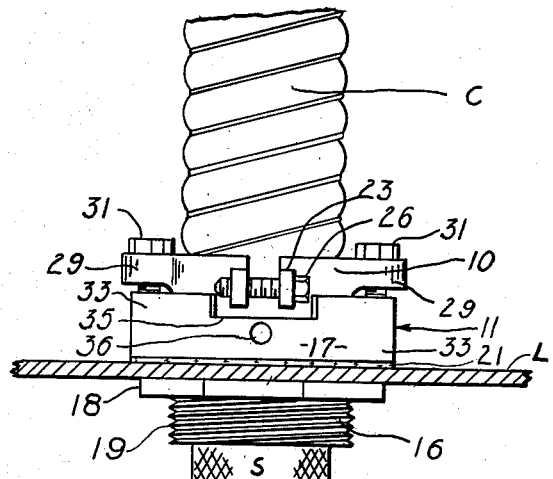

Jan. 16, 1951     H. D. STECHER     2,538,393
CABLE CONNECTOR

Filed Sept. 29, 1948     2 Sheets—Sheet 1

INVENTOR.
HENRY D. STECHER
BY
ATTORNEYS

Jan. 16, 1951     H. D. STECHER     2,538,393
CABLE CONNECTOR

Filed Sept. 29, 1948     2 Sheets—Sheet 2

INVENTOR.
HENRY D. STECHER
BY
ATTORNEYS

Patented Jan. 16, 1951

2,538,393

UNITED STATES PATENT OFFICE 2,538,393

CABLE CONNECTOR

Henry D. Stecher, Lakewood, Ohio

Application September 29, 1948, Serial No. 51,698

10 Claims. (Cl. 285—6.5)

This invention relates to cable connectors for securing armored cable to a perforate plate terminal box, pothead or the like and more particularly to effecting a mechanically-tight and fluid-tight seal as well as an effective electrical ground between the cable armor and the plate, box, wall or body to which the cable is connected.

An object of my invention is to provide an improved cable connector to securely grip and hold a cable and particularly a cable of the armored type to a perforate terminal plate, box, pothead or similar structure, the latter being hereinafter generally and collectively referred to as the terminal element. Another object of my invention is to provide a cable connector which in its preferred and modified forms can be readily attached or secured to a wide variety of instrumentalities such as perforate plates, conduit and terminal boxes or apertured bodies such as potheads and with respect to which will facilitate not only the water-tight seal for the exclusion of water from the interior of the boxes or bodies but will also retain insulating and sealing fluids within such boxes or bodies. A further object is to provide a connector capable of carrying out some or all of the other objects of my invention with respect to the wide range of kinds and sizes of armored cable. Another object of my invention is to provide a multi-part cable connector having a part which is adapted to grip an armored cable and thereafter to be assembled with the other parts, the operation of assembly serving to enhance the grip of the part upon the cable, to produce a fluid-tight seal between the cable and the connector and also to provide an effective ground between the armor and the terminal element. It is also an object to provide such a connector which can be used with a cable to effect a fluid-tight seal as by merely first preparing the cable by winding appropriate turns of electrician's rubber tape around the cable at about the point where the armor of the cable is cut off, and then assembling the cable and connector in a manner such that the turns of tape serve to seal the joint between the connector and the cable in the throat of the connector. A further object is o provide a cable connector having a part adapted to grip the end of an armored cable and having a part with a tapered seat or throat, the parts being assembled in a manner to draw the cable and especially the end of the cable armor onto the seat to effect a fluid-tight seal between the cable and the connector. Another object is to provide for visual inspection of the seating and sealing of the parts of the connector and the armored cable secured thereby. Another object is to provide a clamping member or means for gripping the armored portion of the cable along at least certain lines of contact of relatively high unit pressure whereby to assure not only a strong mechanical grip but also an effective electrical ground connection between the connector and terminal element. Another object is to provide a cable connector which is economical to make and which is easy and convenient to use and will be reliable and dependable for long and arduous service.

Figure 3:
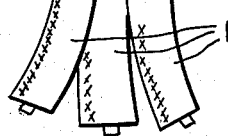
Figure 2:
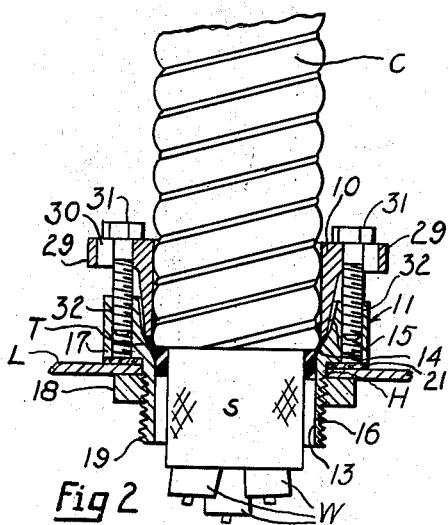
Figure 4:
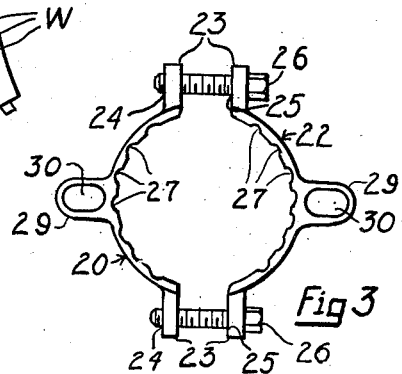
Figure 4:
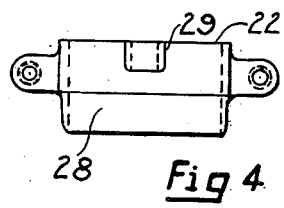
Figure 5:
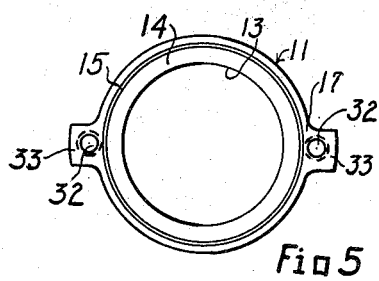
Figure 7:
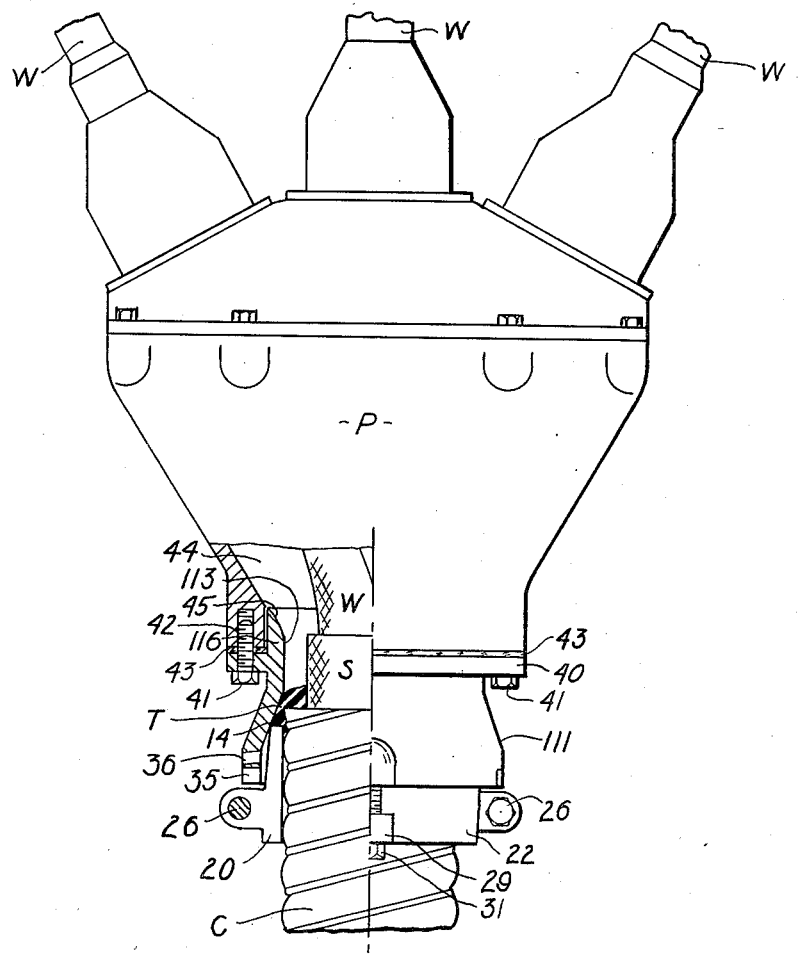
Figure 6:
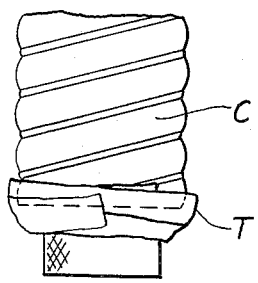

Further objects and advantages will appear from the following description of my invention, reference being made to the accompanying drawing in which Figure 1 is a side elevation of the preferred form of my cable connector together with an armored cable associated with a perforate plate which might also be the perforate wall of an outlet or terminal box or the like; Figure 2 is a longitudinal section of the assembly of Figure 1; Figure 3 is a top plan view of the cable gripping clamps; Figure 4 is a side elevation of the clamps of Figure 3; Figure 5 is a top plan view of the body part of the connector; Figure 6 is a side elevation of a cable wrapped with rubber tape in a manner adapting it for use with my cable connector, and Figure 7 is a side elevation, partly broken away in longitudinal section of a modified form of my invention adapted for use with a pothead or similar body.

A preferred form of cable connector made according to my invention is illustrated for use with an armored cable C which is to be passed through a hole H in the terminal element L such as the wall of a conduit box. In using such cable, the armor is removed from the end of the cable exposing the insulating sheath or wrapper S so that the armor extends only up to about the point of entrance into the box with the separate conductors W of the cable passing into the box or at least beyond the wall or element L. At the point where the cable armor terminates the cable is preferably wrapped with a number of turns of ordinary electrician's rubber tape T as shown in Figure 6 and in section in Figure 2. When the cable is secured by my connector, the wrapping of tape is compressed between the cable and the cable connector parts in a novel manner to form an effective fluid-tight seal. The parts of the connector are also adapted to coact so that the longitudinal motion of the connector parts during assembly materially enhances the mechanical grip and electrical contact of the connector on the cable while compressing the tape and creating the fluid-tight seal.

As best shown in Figures 1 and 2, my preferred form of cable connector comprises clamping means 10 which is adapted to grip and hold the cable C at or near the severed end of the armor. The clamp is adapted to be assembled with a body sleeve member 11 which is secured in the hole H in the terminal element, the parts being assembled in a manner which draws the clamping means in a longitudinal direction to lie partially within the sleeve and draws the cable through the sleeve with the leads W of the cable passing through the bore 13 of the sleeve into the box. The clamping means which is independently adjustable to grip the armor is further constricted upon the cable with additional force by coacting cam or relatively inclined surfaces on the clamp means and the sleeve. Before assembly with the cable connector, the cable is wrapped with the tape T adjacent the end of the armor in the manner mentioned above. Assembly with the connector then brings the taped portion which overlies the severed end of the cable armor and the adjacent sheath to bear forcibly on or adjacent a conical seat or throat 14 in the bore of the sleeve. The tape, or yielding seal in whatever form is thus compressed in the throat of the connector between the seat and the end of the clamp, the cable armor and the sheath and acts as an effective barrier to the passage of fluid between the armor and the sheath and the seat of the sleeve.

As shown in Figure 2 the body 11 comprises an externally threaded stem portion 16 which is adapted to extend through the hole H of the terminal element L. The body also has a head portion 17 which is somewhat larger than the hole H and which is adapted to lie flush against the external face of the wall L. The body member 11 is removably secured to the wall, preferably by a nut 18 which engages external threads 19 of the stem portion and which when drawn tight against the inner surface of the wall pulls the head 17 tight against the outer face of the conduit box to grip the wall. In order to provide a seal between the body and the wall, a gasket 21 may be interposed between the head portion and the exterior surface of the wall as shown and is compressed therebetween when the nut 18 is tightened to pull the head toward the wall.

The bore 13 of the body 11 is cylindrical throughout the stem portion but at about the beginning of the head portion flares outwardly at an angle of about 30° to form the tapered throat or seat 14, and then finally terminates in a slightly conical mouth portion 15 which flares outwardly at an angle of about 7°. The conical surface 14 comprises the essential camming surface mentioned above which acts to constrict the clamping means 10 upon the armor and squeeze the sealing tape upon the cable and increase the force of the grip and security among the several parts.

The armored cable is held directly by the clamping means 10 which is adapted to be clamped onto the cable armor with a positive grip. The clamping means 10 comprises an assembly of two similar semi-ring parts 20 and 22, Fig. 3, each of which has an arcuate length as initially formed somewhat less than 180° in extent but which when gripping a cable comprise a substantially annular clamp, the completeness of which depends on the size of cable being gripped; the arcuate length of the parts 20 and 22 being proportioned with respect to the smaller diameter of the throat 14 to admit full and free constriction of the parts upon the smallest size armor that the connector is intended to secure. Each of the parts has chordal tabs or wings 23 extending outwardly from each end, the wings on the part preferably having threaded holes 24 and the wings of the part 22 having drilled holes 25. The two parts 20 and 22 are assembled by means of cap screws 26 which pass through and closely fit the holes 25 and threadedly engage the tapped holes 24 respectively. The parts, as assembled in Figure 3, take the approximate form of a circle of substantially the same diameter as the largest cable with which they are intended to be used. The semi-ring parts preferably are formed or cast from resilient or yielding metal in order that they may accommodate themselves to cables of widely different diameters. When the clamp is clamped onto cables of large diameter they may open to arcs of lesser curvature and for cables of small diameter the ring parts are capable of curving and closing to arcs of greater curvature. In use the clamps are assembled around the armor of the cable adjacent the end thereof and the screws 26 are tightened to draw the arcuate ring parts together. When the screws 26 are tightened, the clamping parts conform to the cable in curvature and size and tend to grip it with substantial force. I prefer that the screws 26 have a nice fit in the holes 25 and in threads of the tapped holes 24 whereby to tend to hold the wings square with the screws to flex the arcuate portions of the clamp parts when the screws are tightened rather than flexing the wings relative to the arcuate parts.

The clamp parts 20 and 22 are given additional gripping means in the form of tapered skirt portions 28 which extend below the wings 23. When the parts are assembled the skirts are drawn into the mouth 20 of the body, and upon such assembly are forced inwardly to slide over the tapered camming surfaces of the throat 14 which force the skirts and parts to close upon the cable and thus wedge the cable within the connector.

The parts 20 and 22 are preferably given longitudinal internal scallops 27 shown in end view in Figure 3. The scallops are preferably shallow though deep enough to enable the clamps more readily to adust themselves to cables of varying size. The longitudinal edges of each of the scallops also comprise biting edges which substantially enhance the grip of the clamps upon the armored cable and enhance the electrical contact therebetween.

In order to secure the clamp means to the sleeve body member and thus secure the clamped cable to the terminal element, the clamps are provided with radially extending centrally disposed lugs 29 having slots 30 through which screws 31 are adapted to extend to engage threaded holes 32 in the head of the body 11. When the screws 31 engage the head they not only secure the cable to the body and thus to the terminal element, but they also draw the clamp 20—22 and the cable longitudinally into the body producing the coacting cam action and grip mentioned above and compressing the seal T adjacent the end of the armor against the throat 14 and the unarmored cable.

The lugs 29 are equipped with radially extending slots 30 rather than to circular holes to provide some play between the body and the clamps so that the screws 31 can engage the tapped holes 32 regardless of the size of cable gripped by the clamps. Thus when the connector is used with relatively large cables, the clamps will be adjusted to a large diameter and the screws 31 will extend through the interior portion of the slots while for small cables the lugs will move inwardly with the clamps and the screws 31 will extend through the exterior portion of the slots. The slots 30 thus enable use of my connector with a rather wide range of cable sizes.

In use the stem 16 is preferably inserted within the hole H of the element L and secured thereto by the nut 18, the gasket 21 being compressed to seal the joint between the connector and the wall. The armor is stripped from the cable to expose a convenient length of unarmored cable and the portion adjacent the end of the armor is wrapped with a number of turns of insulating tape, rubber or rubber-like tape such as is found in every electrician's kit, the turns of tape T overlying the end of the armor and a portion of the insulation sheath as shown in Figure 6. The cable is then inserted in the connector body until the tape contacts the seat 14. Preferably at this time and in this position the clamp means 19 is placed around the cable and in their loosely assembled position are inserted as far as possible within the body, the skirt portions 28 usually lying partially within the sleeve of the body of the connector. The screws 26 are then tightened to draw the clamps tightly onto the armor, the scallops permitting the clamps to adjust themselves to the diameter of the particular cable being used and serving to bite into the armor. Then the screws 31 extending through the slots 30 of the clamps 19 are tightened within the tapped holes 32 to secure the clamps to the sleeve and by this means to secure the cable to the terminal element. As the screws 31 are tightened the clamps and the cable are drawn longitudinally within the sleeve and into the throat 14. As this longitudinal movement of assembly progresses the seal and tape T and the taped and clamped portion of the cable is squeezed in the throat 14 and is compressed with increasing force. The screws 26 may also be tightened while the screws 31 are being tightened to augment final grip and connection.

The head may be cut away as at 35 to form wide diametrically opposite notches in which the wings 23 of the clamping means may enter. With the provision of notches 35 greater longitudinal movement is permitted relative to the compactness and neatness of assembly of the whole connector. Preferably I provide a small inspection hole 36 in the body below one of the notches 35 and above the tapered throat 14 through which the coaction and disposition of the connected parts may be observed.

With but small modification of the externals of the body portion of my connector the same may be readily adapted to secure a cable and particularly an armored cable to a pothead P, as shown in Figure 7, and also to serve as a fluid-tight closure for the bottom of the pothead. In this form of my invention the clamping means 20 and 22 may be identical with those described above and the body 111 may be substantially identical interiorly with the body 11 described above, containing inter alia the tapered throat 14 for the same purposes and functions above described and for the same coaction with the seal or sealing tape T which may be employed in the same way and used to accomplish the same results as those above described. Externally the body 111 of the connector is provided with a lateral flange 40 through which appropriate clamp bolts 41, entering tapped holes 42 in the lower walls of the pothead, facilitate attachment of the connector to the pothead; a gasket 43 interposed between the flange 40 and the periphery of the bottom wall of the pothead sealing the joint therebetween. When, as is not unusual, the interior space 44 of the pothead is filled with fluid insulating material, the seals afforded by the tape T and the gasket 43 respectively prevent leaking of any of the fluid contents therefrom. The stem portion 116 of the connector has a plain rather than threaded external surface and the bore 113 is preferably flared as at 45 to merge with the adjacent interior surfaces of the pothead structure; the sheath S of the cable and the conductors W pass through the bore and into the pothead in substantially the same relation described above. In this form of my invention I prefer to preserve the inspection hole 36 in the same relation as that described above but not there shown in section. In Fig. 7 there are also shown clamp bolts 31 coacting with the lugs 29 performing the same or substantially the same offices in the same way as above described. In this modified form of my invention the armored cable would be securely gripped for the reasons above mentioned, an effective ground connection between the ground and the armor would be effected and the fluid seal between the cable and the connector would do the same work and get the same results as above described; my connector here specifically serving the additional function of a fluid closure member for a fluid containing vessel in addition to excluding the entry of external fluids into the vessel from external sources.

While I have illustrated and described a preferred and modified form of my invention and particular preferred constituent parts thereof, such for example as the tape T as a preferred sealing element, changes, modifications and improvements will occur to those skilled in the art who come to understand and practice my invention without departing from the scope and spirit thereof, and I do not care to be limited in the scope and effect of my patent to the form herein specifically disclosed nor in any manner other than by the claims appended hereto.

I claim:

1. A cable connector for securing an armored cable comprising a tubular body member, a converging conical surface in said body member, clamping means adapted to be independently adjusted to grip said cable, and means connected to said body and to said clamping means for drawing said clamping means toward and into said body member and into camming engagement with said converging conical surface whereby said clamping means is constricted by said surface to grip said cable with additional force.

2. The cable connector according to claim 1 wherein said clamping means comprises a split annulus adapted to substantially encircle said cable and screw means for constricting said annulus to grippingly engage said cable.

3. The cable connector according to claim 2 wherein said clamping means has a plurality of longitudinally extending inwardly facing scallops with interposed solid ridges having sharp edges for biting into said cable when said annulus is constricted thereon.

4. The cable connector according to claim 1 wherein said clamping means comprises a pair of arcuately shaped parts adapted to be secured together to substantially encircle and grip said cable.

5. The connector according to claim 4 wherein said parts have outstanding wings at their midportions respectively and a pair of screws each adapted to extend through a wing of one part and threadedly engage said body member to draw said parts into said body.

6. The cable connector according to claim 1 wherein said body member has an internal seat, and compressible tape material wound about said cable and disposed between said cable and said seat, whereby said material is compressed between said cable, said seat, and said clamping means to form a water-tight seal when the clamping means is drawn into said body member.

7. A cable connector for securing an armored cable relative to a hole in a wall of a conduit box or the like comprising a tubular body part adapted to extend through said hole and to be removably secured to said wall, a clamping part adapted to be constricted onto the cable to grip the cable independently, means for drawing the clamping part toward and into said body part and removably securing the parts together, and cam means on one of said parts adapted to coact with the other of said parts when said parts are drawn together to constrict said clamping part onto the cable to grip it with additional force.

8. A cable connector according to claim 7 wherein said clamping part comprises a pair of substantially semi-circular arcuate parts adapted to be secured together at their ends by screw means, and said cam means comprises conically tapered surfaces on said body coactable with said arcuate parts.

9. A cable connector for securing an armored cable relative to a hole in a wall and effecting a water-tight seal comprising a tubular body member open at both ends and adapted to extend through said hole and to be removably secured to said wall, a conical seat in said body member, and compressible material adapted to fit about said cable between said cable and said seat, clamping means adapted to grip said cable, and means connected to said body and to said clamping means for drawing said clamping means toward the conical part of said body member whereby said material is compressed between said seat and said cable to create a water-tight seal.

10. A cable connector for securing an armored cable within a hole in a wall of a conduit box or the like comprising a tubular body member having a threaded stem adapted to extend through said hole and to be secured thereto by a nut engaging said stem and having an enlarged head adapted to abut said wall, said body member having a cylindrical bore extending through the threaded stem and flaring outwardly at a substantial angle to form a conical seat and finally terminating in a mouth portion flaring at a relatively slight angle, a clamp comprising a pair of substantially identical arcuate parts having outwardly extending wings at each end, the parts being connected together at each end by a screw extending through a hole in the wing of one of the parts and threadedly engaging a tapped hole in the wing of the other part, each of the parts having a slotted boss, and screws adapted to extend through the slots of said bosses and engage threaded holes in said head to draw said clamp toward and into said body member and to removably secure the same therein, whereby said clamp is adapted to engage said mouth portion and said seat portion and be circumferentially constricted thereby to grip said cable with additional force.

HENRY D. STECHER.

REFERENCES CITED

The following references are of record in the file of this patent:

UNITED STATES PATENTS

| Number | Name | Date |
| --- | --- | --- |
| 1,211,417 | Davis | Jan. 19, 1917 |
| 2,092,343 | Wayman | Sept. 7, 1937 |

FOREIGN PATENTS

| Number | Country | Date |
| --- | --- | --- |
| 121,407 | Germany | Aug. 14, 1900 |